United States Patent
Satou et al.

(10) Patent No.: US 7,630,150 B2
(45) Date of Patent: Dec. 8, 2009

(54) OBJECTIVE LENS DRIVING APPARATUS AND A MANUFACTURING METHOD THEREOF

(75) Inventors: Yoshihiro Satou, Yokohama (JP); Katsuhiko Kimura, Kasumigaura (JP); Hidenao Saito, Yokohama (JP); Jun Hato, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 0 days.

(21) Appl. No.: 11/698,106

(22) Filed: Jan. 26, 2007

(65) Prior Publication Data
US 2008/0100931 A1 May 1, 2008

(30) Foreign Application Priority Data
Oct. 27, 2006 (JP) ............... 2006-291916

(51) Int. Cl.
*G02B 7/02* (2006.01)
(52) U.S. Cl. ...................... 359/819; 359/811
(58) Field of Classification Search .......... 359/811, 359/813, 814, 819, 820, 822, 823, 831, 425, 359/503, 644, 668, 700; 396/284, 336, 373, 396/458–460, 535; 250/333, 458.1; 356/254
See application file for complete search history.

(56) References Cited

U.S. PATENT DOCUMENTS

| | | | | |
|---|---|---|---|---|
| 3,137,755 A | * | 6/1964 | Smith | 356/254 |
| 4,258,982 A | * | 3/1981 | Skinner et al. | 359/819 |
| 4,472,024 A | * | 9/1984 | Konomura et al. | 359/814 |
| 4,658,390 A | * | 4/1987 | Fujii et al. | 369/44.16 |
| 4,684,231 A | * | 8/1987 | Athy | 396/544 |
| 4,850,674 A | * | 7/1989 | Hasselskog | 359/820 |
| 7,289,282 B2 | * | 10/2007 | Matsushima | 359/819 |
| 2007/0011694 A1 | * | 1/2007 | Uno et al. | 720/688 |
| 2007/0079316 A1 | * | 4/2007 | Ochi et al. | 720/682 |

FOREIGN PATENT DOCUMENTS

| | | |
|---|---|---|
| JP | 09-198682 | 7/1997 |
| JP | 2006-209875 | 8/2006 |

* cited by examiner

*Primary Examiner*—Loha Ben
(74) *Attorney, Agent, or Firm*—Antonelli, Terry, Stout & Kraus, LLP.

(57) ABSTRACT

An objective lens actuator that can accommodate higher density and speed is provided by improving frequency characteristics of an objective lens.

The objective lens actuator includes an objective lens, a cylindrical lens holder that holds the objective lens, and a reinforcement part disposed in an opening opposite to the objective lens of the lens holder. The reinforcement part has a size that occupies one third to one half of the cylindrical wall of the lens holder from the end of an aperture along the optical axis. In this range, the high order resonance frequencies of the lens holder can be increased, and therefore, it is possible to obtain an objective lens actuator that can minimize the vibration amplitude at the high order resonance frequencies.

14 Claims, 8 Drawing Sheets

PRIMARY VIBRATION MODE          SECONDARY VIBRATION MODE

FIG. 7

RATIO OF HEIGHT Lb OF LENS HOLDER ALONG OPTICAL AXIS
TO HEIGHT Lt OF PROTRUDING PORTION

OBJECTIVE LENS DRIVING APPARATUS AND A MANUFACTURING METHOD THEREOF

FIELD OF THE INVENTION

The present invention relates to an objective lens actuator for driving an objective lens that collects light on a recording surface of an optical disc.

BACKGROUND ART

A spot where light is collected by an objective lens always needs to be positioned in the focusing direction and the tracking direction, and therefore, control bands for focusing and tracking need to be increased in accord with improvement in the rotation speed of an optical disc. Additionally, in order to realize stable control, higher order resonance frequencies of an objective lens actuator need to be approximately five times or greater than the control bands. Since the higher order resonance of the objective lens actuator is due to the elastic resonance of a lens holder, in order to increase the high order resonance frequencies, the stiffness of the lens holder needs to be increased.

In such optical disc drive, the objective lens actuator is an apparatus for driving an objective lens that collects light on a recording surface of an optical disc in the focusing direction (the direction in which the objective lens is moved closer to/farther from the optical disc surface) and in the tracking direction (radially with respect to the optical disc).

As a method for realizing such objective lens actuator with higher stiffness, Patent Document 1 is directed to improving stiffness, based on improvement in the higher order resonance frequencies of the lens holder, by changing the elastic constant of the material of the lens holder that holds the objective lens.

[Patent Document 1] JP Patent Publication (Kokai) No. 2006-209875 A (FIG. 52)

SUMMARY OF THE INVENTION

Problems to be Solved by the Invention

While the above conventional technology is directed to improving the stiffness of the lens holder based on the material of the lens holder, since the lens holder is generally molded by an injection molding method, the material is generally plastic. The elastic constant of plastic can be increased only up to approximately one and a half times even when the material is changed, and thus, the higher order resonance frequencies can be increased only up to approximately the square root of the elastic constant of the material of the lens holder; that is, only up to approximately 1.2 times.

The present invention increases the stiffness of a lens holder without the above problem.

Means of Solving the Problems

Thus, the present invention provides an objective lens actuator comprising an objective lens, a cylindrical lens holder that holds the objective lens, and a reinforcement part disposed in an opening opposite to the objective lens of the lens holder.

Effects of the Invention

In accordance with the present invention, since the stiffness of the lens holder can be increased, it is possible to obtain an objective lens actuator having an objective lens with improved following specifications with respect to an optical disc.

DESCRIPTION OF PREFERRED EMBODIMENTS OF THE INVENTION

Embodiment 1

Embodiments of the present invention will be described with reference to FIGS. 1 to 7 and Expression 1.

Expression 1

$$\phi a > \phi b + 2La*\sin\theta \qquad (1)$$

Figure 1:
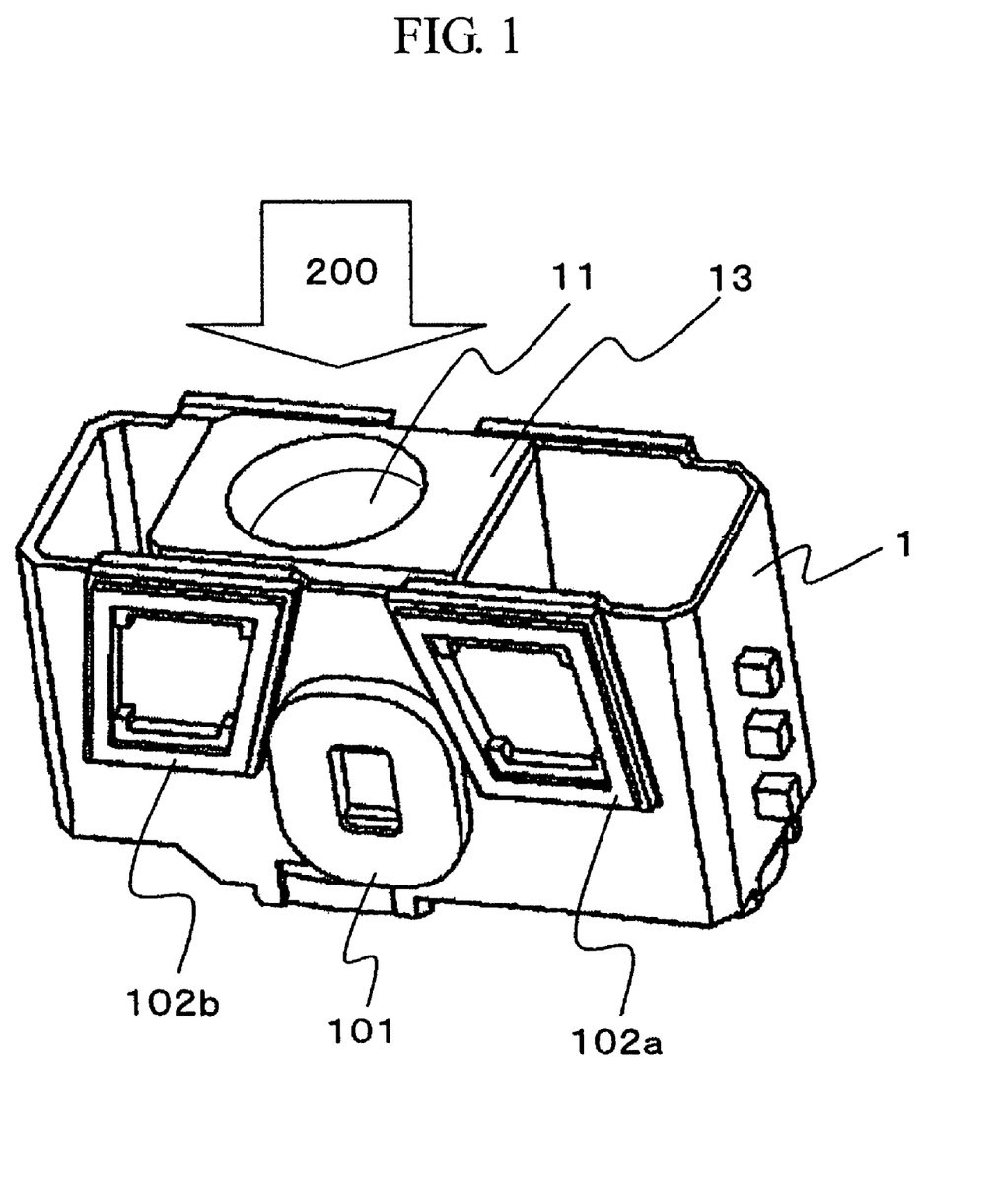
FIG. 1 shows a perspective view of a first embodiment of an objective lens actuator of the present invention.
Figure 2:
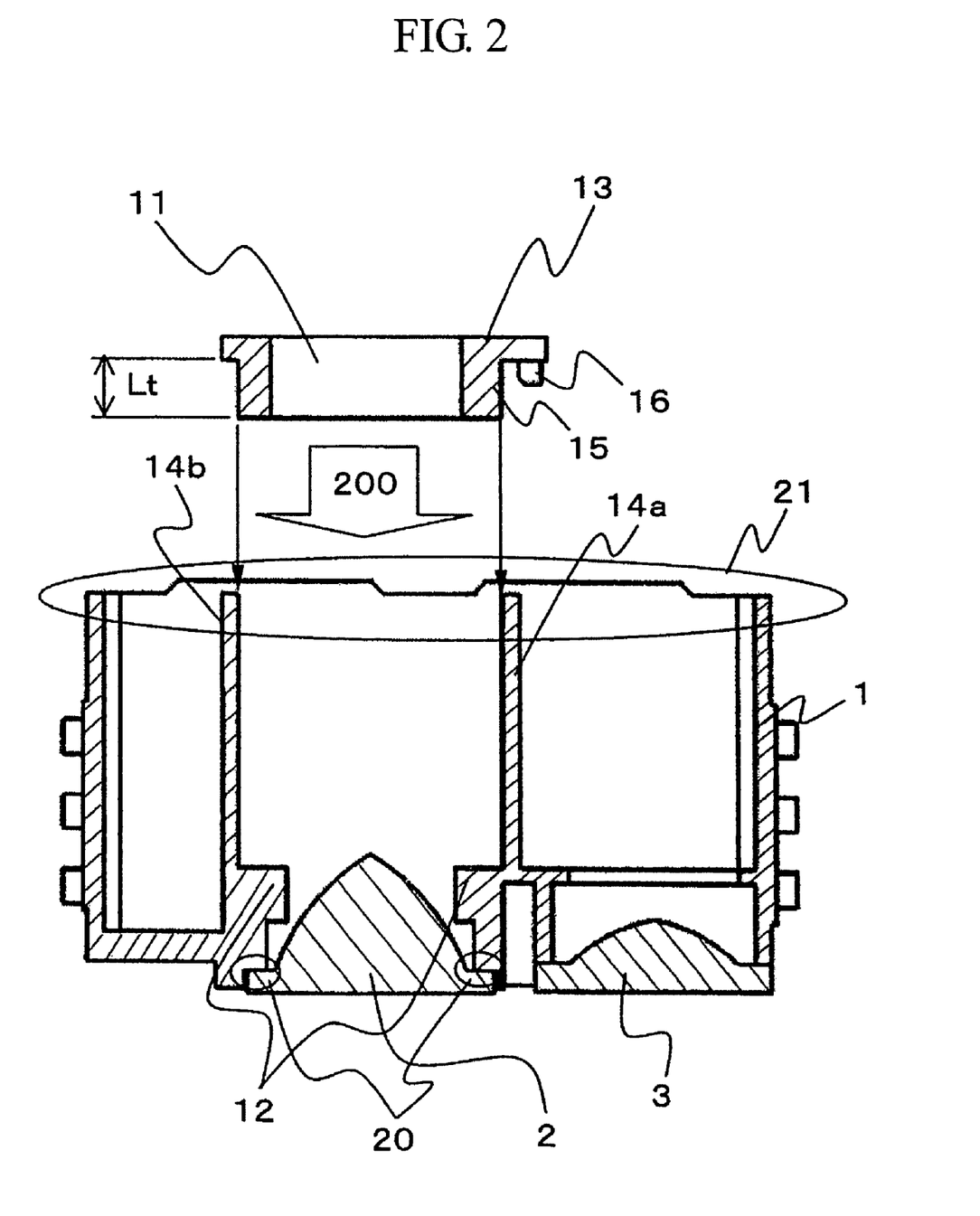
FIG. 2 shows a cross-sectional view of the first embodiment of the objective lens actuator of the present invention.
Figure 3:
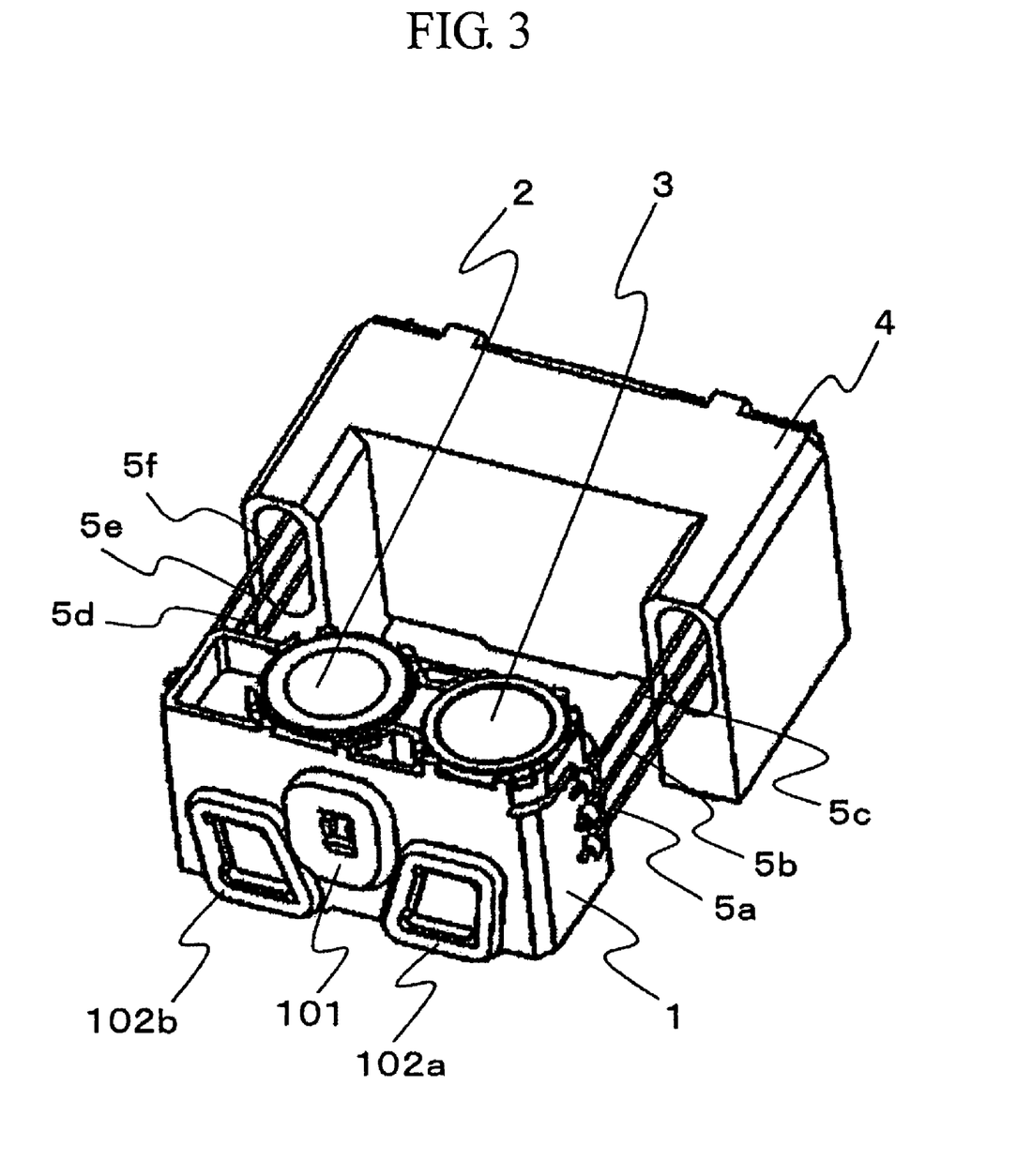
FIG. 3 shows an explanatory diagram of a structure of the objective lens actuator of the present invention.
Figure 4:
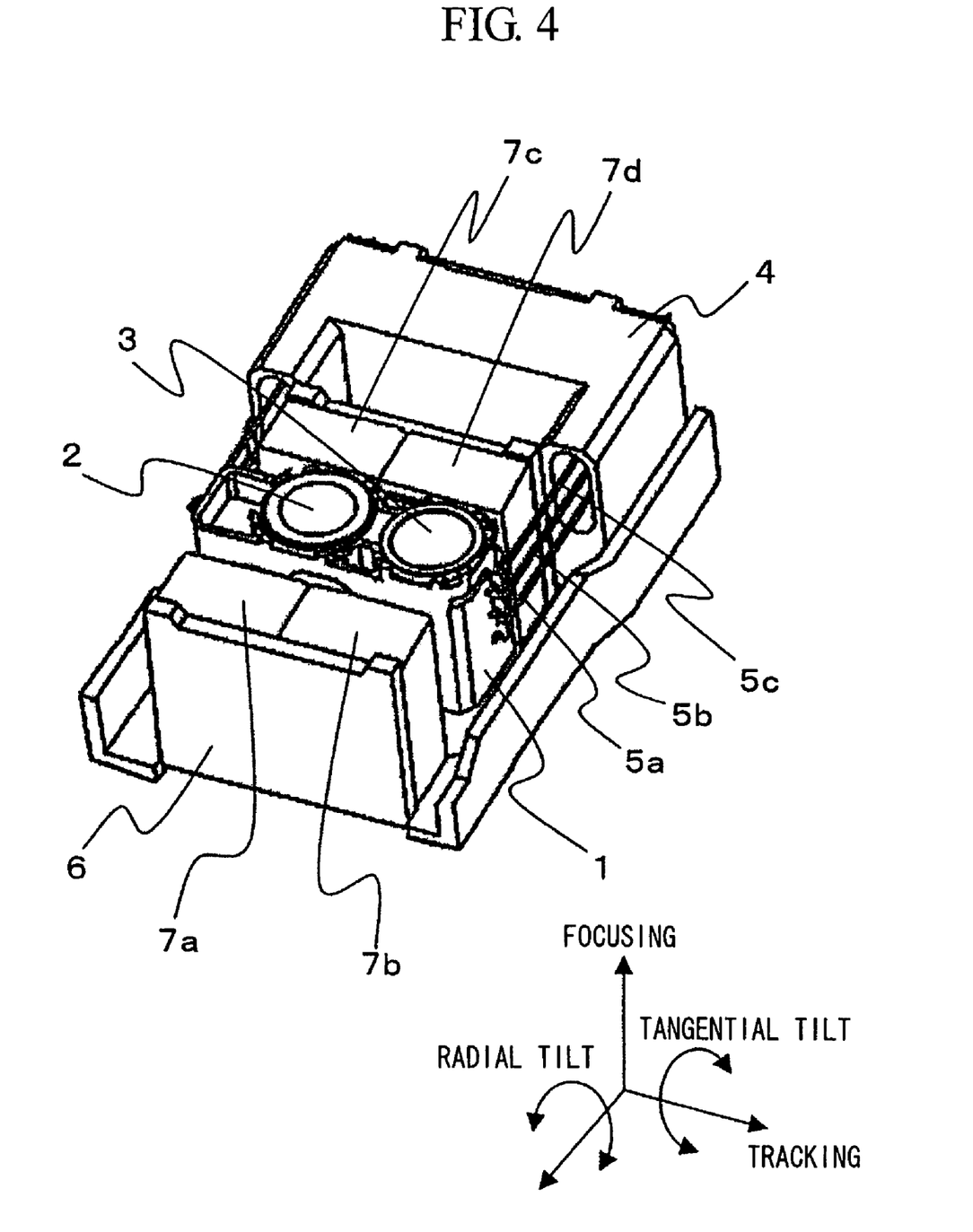
FIG. 4 shows an overall view of the structure of the objective lens actuator of the present invention.
Figure 5:
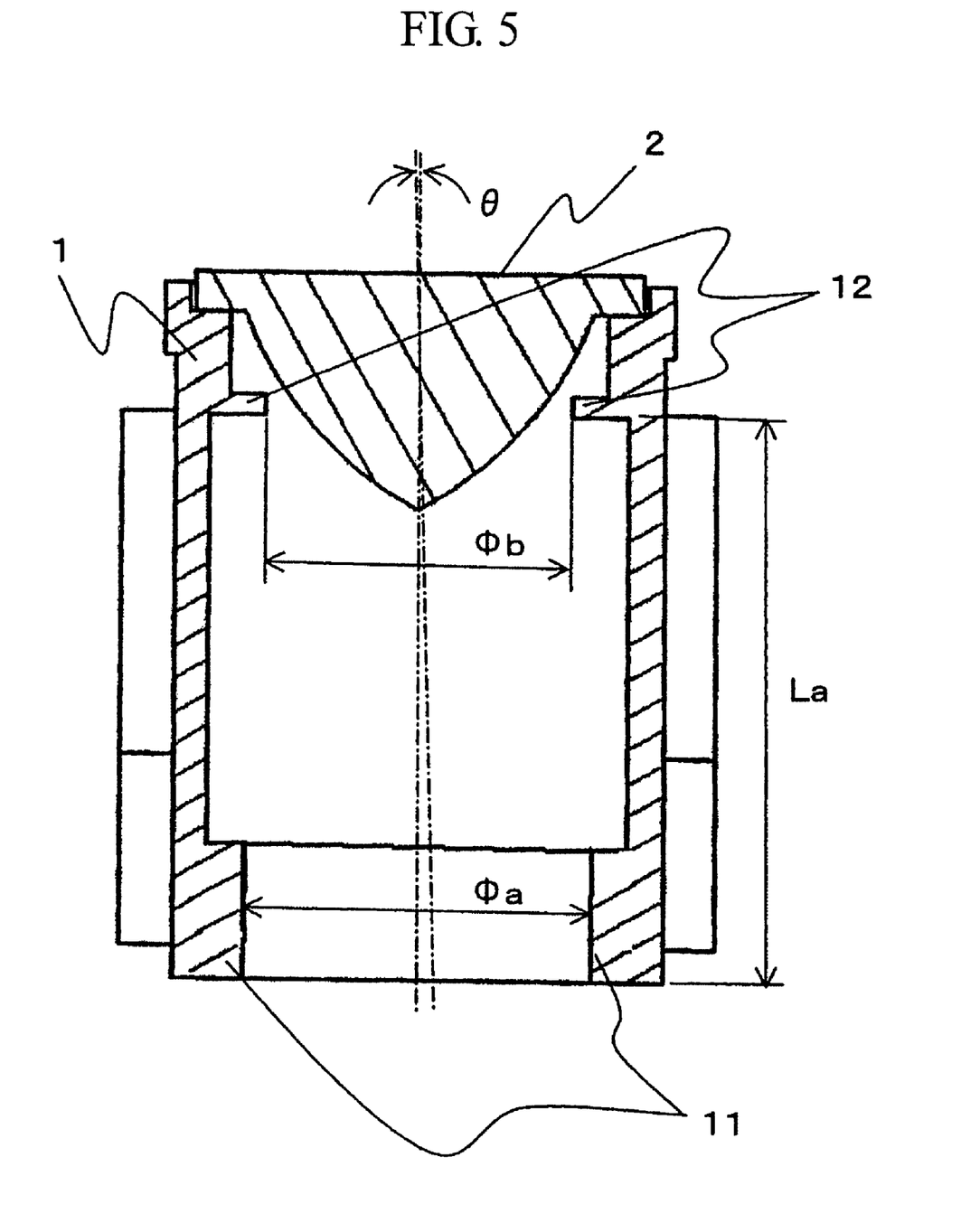
FIG. 5 shows a cross-sectional view with which the first embodiment of the objective lens actuator of the present invention is supplementarily explained.
Figure 6:
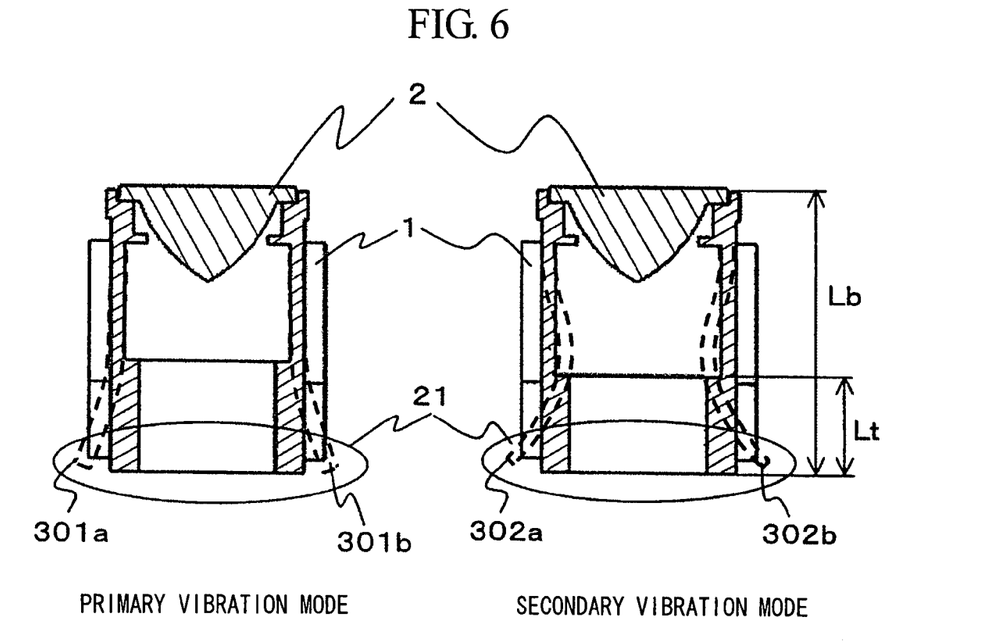
FIG. 6 shows explanatory diagrams of higher order resonance modes of the objective lens actuator of the present invention.
Figure 7:
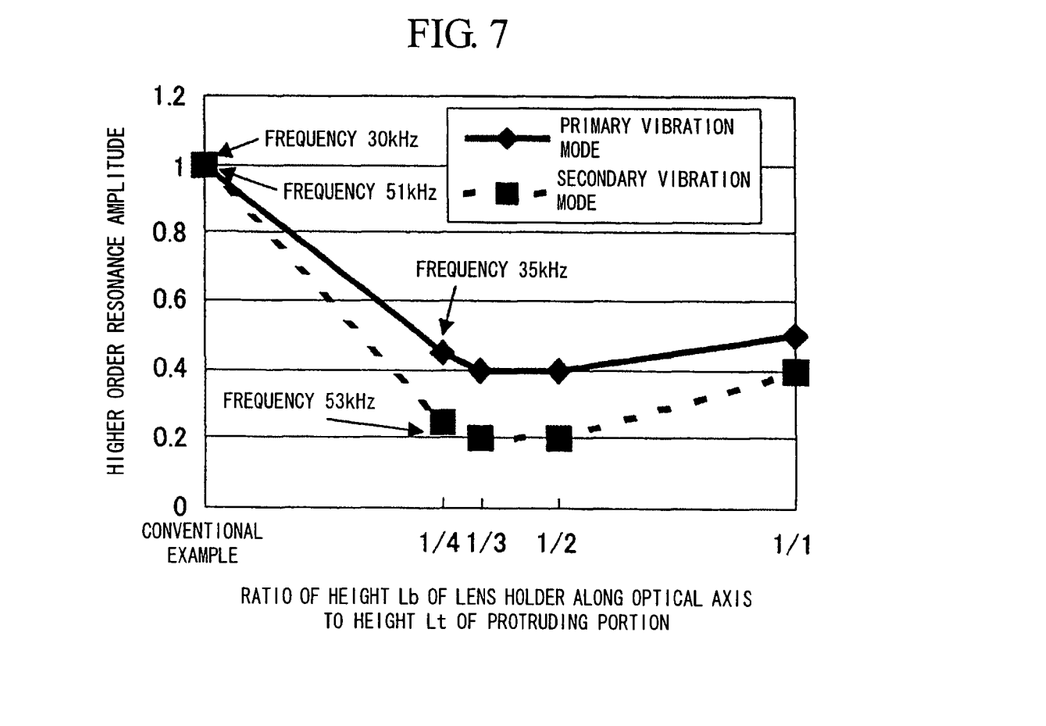
FIG. 7 shows experimental results indicating the effect of the first embodiment of the objective lens actuator of the present invention.

FIG. 1 is a perspective view of a lens holder, showing a laser-light entrance portion. FIG. 2 shows a cross-sectional view of the lens holder of an objective lens actuator excepting a magnetic circuit, taken along the center of an objective lens in the tracking direction, and the figure shows a schematic diagram of the present embodiment. FIG. 3 shows a perspective view of a structure of the objective lens actuator, excepting the magnetic circuit. FIG. 4 shows an explanatory diagram of the objective lens actuator as a whole. FIG. 4 shows each direction of movement, and in the figure, the tangential direction corresponds to a tangential line of an optical disc not shown, and the tracking direction corresponds to the direction radially with respect to the optical disc. The focusing direction corresponds to the optical axis of an objective lens 1. Further, the tangential tilt direction is the direction in which rotation is tilted in the tangential direction, and the radial tilt direction is the direction in which rotation is tilted in the tracking direction. FIG. 5 schematically shows cases in which a tangential tilt or the like is caused in FIG. 1. FIG. 6 shows explanatory diagrams of primary and secondary vibration modes that are higher order resonances in the present embodiment. FIG. 7 shows the comparison of the higher order resonances between the present embodiment and a conventional example, and it also shows examination results on the height of a protruding portion in the present embodiment.

As shown in FIG. 3, a first objective lens 2, a second objective lens 3, focusing coils 102*a* and 102*b*, and a tracking coil 101 are mounted on a lens holder 1. The lens holder 1 is supported by elastic support parts 5a to 5f. These elastic support parts 5a to 5f each are fixed to a fixing member 4. Since the elastic support parts 5a to 5f are used for supplying electric power to each of the coils 101, 102a, and 102b, the elastic support parts 5a to 5f are composed of conductive members. Further, the elastic support parts 5a to 5f are electrically fixed to the individual coils 101, 102a, and 102b mounted on the lens holder 1 by soldering or the like. As shown in FIG. 2, the lens holder 1 is provided with an aperture portion 12 near the laser-light entrance portion of the first objective lens 2. Further, a reinforcement part 13 comprising an opening 11 and a protruding portion 15 is attached to the end face of the lens holder 1 that is opposite to the mounting surface 20 of the first objective lens 2, so that the reinforcement part 13 is located opposite to the aperture portion 12. If the lens holder 1 having the aperture 12 is made by an injection molding method, an opening end 21 cannot be made thick. If the entire cylindrical walls 14a and 14b are made thick, it is not very effective in terms of vibration as can be seen from FIG. 6. Thus, the opening end 21 alone needs to be made thick. Accordingly, in order to make a lens holder 1 having a thick opening end 21, the reinforcement part 13 needs to be separately made. The protruding portion 15 with which the reinforcement part 13 is provided is formed so that it is attached firmly to the cylindrical walls 14a and 14b of the lens holder 1, and when combined with the lens holder 1, they form an integral structure via an adhesive or the like. Further, together with a positioning protruding portion 16, the protruding portion 15 with which the reinforcement part 13 is provided is used for positioning the reinforcement part 13 when combined with the lens holder 1. In this case also, the reinforcement part 13 is combined with the cylindrical walls 14a and 14b of the lens holder 1. In view of cases in which the lens holder 1 is tilted as FIG. 5 and Expression 1 show the size of the opening 11 is set so that it is larger than the aperture portion 12 disposed close to the objective lens 2 or 3, and that it has the difference larger than the product of the sin component at an angle θ of rotation of the objective lens and the distance La between the aperture portion 12 and the opening 11 along the optical axis.

As shown in FIG. 4, permanent magnets 7a to 7d are positioned on a yoke 6 so that they are separated from the individual coils 101, 102a, and 102b. The lens holder 1 is displaced due to electromagnetic force produced by the magnetic circuit comprising the permanent magnets 7a to 7d and the individual coils 101, 102a, and 102b disposed on the lens holder 1.

Next, in order to determine the effects of the reinforcement part 13 and an optimum value of the height Lt of the protruding portion 15 of the reinforcement part 13, parameters for the height of the protruding portion 15 were examined. Higher order resonance in the present embodiment will be described with reference to FIG. 6. FIG. 6 shows a cross-sectional view of the lens holder 1, and it also shows higher order resonance vibration modes. The higher order resonance in the present embodiment involve such vibration modes as indicated by reference characters 301a and 301b; these modes are the lowest order and the largest amplitude in the higher order resonance modes. The shapes of these modes are deformation of walls of the lens holder 1 and resemble deformation of a cantilever beam. Such mode will be hereafter referred to as a "primary vibration mode." Further, as indicated by the reference characters 302a and 302b, the secondary vibration mode, which is a higher order vibration mode of the primary vibration mode, is a state in which one fourth to one fifth of the vibrating part is greatly displaced as a node. Since this secondary vibration mode has a large amplitude, by evaluating the primary and secondary vibration mode frequencies or the vibration amplitudes thereat, the effect of higher stiffness of the lens holder 1 can be evaluated. Thus, vibration amplitudes at these primary and secondary vibration mode frequencies were used for evaluation items, and a conventional lens holder that does not include the member 13 was used as a reference. The results are shown in FIG. 7. When the ratio of the height Lt of the protruding portion 15 to the height Lb of the lens holder 1 along the optical axis is ¼, the primary vibration mode frequency was improved from conventional 30 kHz to 35 kHz, and the secondary vibration mode frequency was improved from conventional 51 kHz to 53 kHz. Furthermore, while no changes in the primary and secondary vibration mode frequencies were seen, vibration amplitudes were minimized when the height Lt of the protruding portion 15 was changed to one third to one half of the height Lb of the lens holder 1 along the optical axis. Based on the above results, it can be seen that it is only necessary that the height Lt of the protruding portion 15 of the tabular member 13 is one third to one half of the height Lb of the lens holder 1 along the optical axis. While the results shown herein are based on cases in which the thickness of the protruding portion 15 is two and a half times that of the cylindrical wall of the lens holder 1, the range of Lt is proportional to the height of the lens holder 1 along the optical axis, and therefore, the thickness of the protruding portion 15 simply affects the amount of suppression of the vibration amplitude. Namely, on the condition that the height Lt is one third to one half of the height Lb, even when the thickness of the protruding portion 15 is one tenth of the thickness of the cylindrical wall of the lens holder 1, the effect of suppressing vibration can be obtained. Note that if the protruding portion 15 is made thicker, the effect of suppressing vibration will be more effective. However, since the total weight of the lens holder and the reinforcement part becomes greater when the protruding portion 15 is made thicker, it is necessary to set the thickness of the protruding portion 15 within the range (3.8 times or less, for example) in which the lens holder can be driven.

Thus, as described above, by structuring the objective lens actuator as in the present embodiment, the higher order resonance frequencies of the lens holder can be increased, and it is possible to obtain an objective lens actuator that can minimize the vibration amplitude at the higher order resonance frequencies.

While the opening having a shape similar to the aperture portion is described in the present embodiment, the present embodiment can be achieved even when the shape of the opening is not similar to that of the aperture portion.

Figure 8:
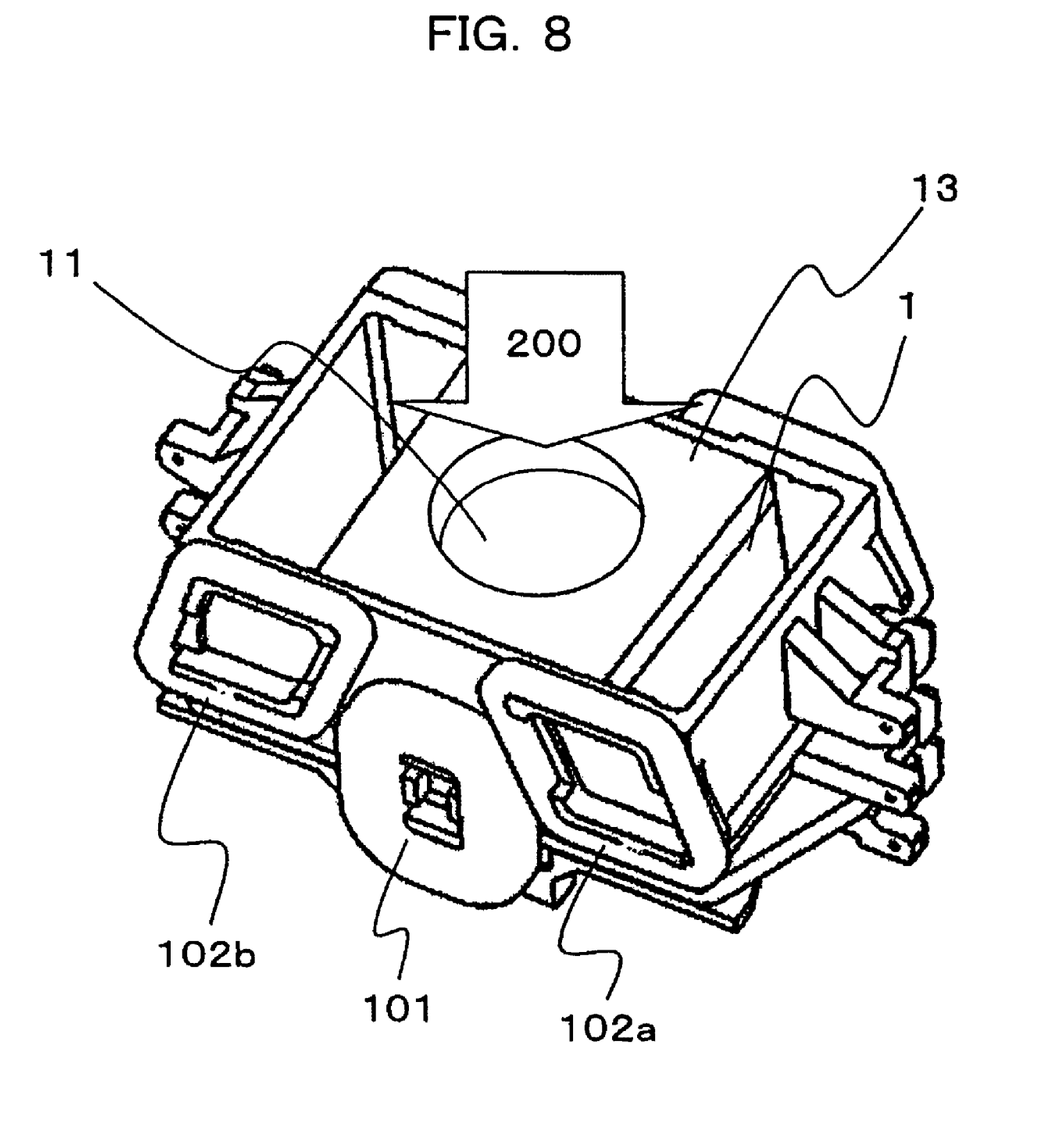
FIG. 8 shows a structure of the objective lens actuator of the present invention in cases in which one objective lens is used.
Figure 9:
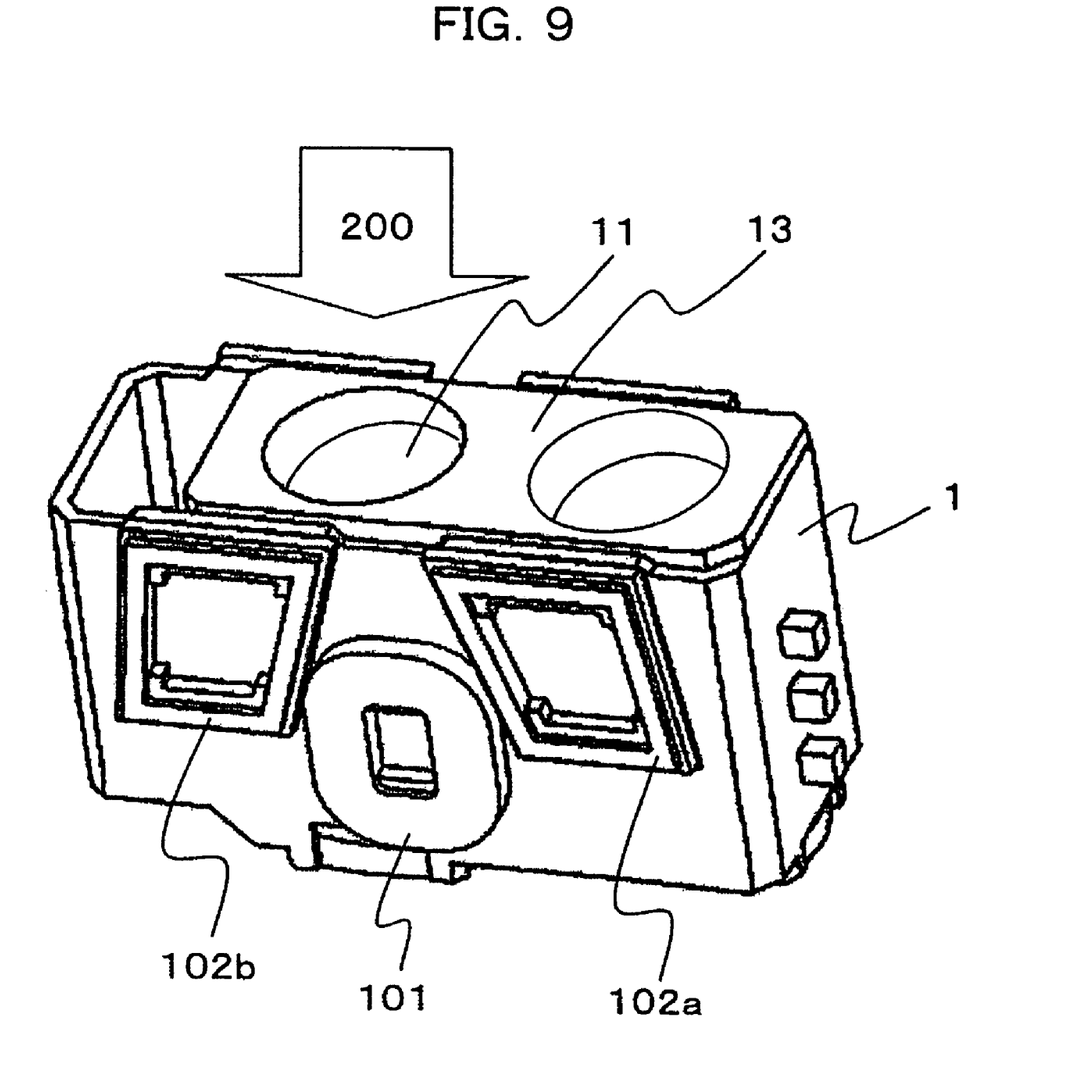
FIG. 9 shows a structure of the objective lens actuator of the present invention in cases in which two objective lenses and two openings are used.

While cases in which two objective lens are used are described in the embodiment of the present invention, as shown in FIG. 8, the present invention is also effective in cases in which one objective lens is used. In this case, the number of openings in the member is one. Further, in the embodiment of the present invention, while cases in which only one opening is used in the tabular member are described as shown in FIG. 9, two openings may be used when two objective lenses are used.

The invention claimed is:

1. An objective lens module, comprising:
  an objective lens;
  a cylindrical lens holder that holds the objective lens in an opening delimited by a cylindrical wall of the cylindrical lens holder proximate to one end of the opening of the cylindrical wall of the cylindrical lens holder; and
  a reinforcement part fixed to the cylindrical lens holder and at least partially disposed in the opening of the cylindrical wall of the cylindrical lens holder proximate to another end of the opening which is opposite to the objective lens;

wherein the reinforcement part which is at least partially disposed in the another end of the opening has a thickness in a direction transverse to an axis of the cylindrical lens holder which is greater than a thickness in the direction transverse to the axis of the cylindrical lens holder of at least a portion of the cylindrical wall of the cylindrical lens holder which extends from the another end of the opening toward the one end of the opening where the objective lens is held so as to enhance the stiffness of the cylindrical lens holder at least proximate to the another end of the opening.

2. The objective lens module according to claim 1, wherein the reinforcement part has a size that occupies one third to one half of the cylindrical wall of the cylindrical lens holder from the another end of the opening along the optical axis.

3. The objective lens module according to claim 1, wherein the objective lens is held proximate to the one end of the opening and the reinforcement part is disposed at least partially within the opening of the cylindrical lens holder proximate to the another end of the opening which is opposite the one end.

4. The objective lens module according to claim 3, wherein the cylindrical wall of the cylindrical lens holder includes a tubular member having the opening therethrough that holds the objective lens within the opening proximate to the one end thereof, and the reinforcement part is disposed proximate to the another opposite end of the tubular member which is opposite to the objective lens at least partially within the opening of the tubular member thereat.

5. The objective lens module according to claim 4, wherein the reinforcement part extends within the opening of the tubular member at least one third of a height of the cylindrical wall of the tubular member from the another opposite end thereof.

6. The objective lens module according to claim 5, wherein the reinforcement part extends no greater than ½ of the height of the cylindrical wall of the tubular member.

7. The objective lens module according to claim 4, wherein the reinforcement part is a cylindrical member having a portion extending within the another opposite end of the tubular member and a portion extending radially outwardly beyond the cylindrical wall of the tubular member.

8. The objective lens module according to claim 1, wherein the reinforcement part and the another end of the opening do not support another objective lens thereat.

9. A manufacturing method of an objective lens module, comprising:

preparing an objective lens;

forming a cylindrical lens holder provided with an aperture portion delimited by a cylindrical wall that limits the diameter of a beam incident on the objective lens with an injection molding method;

fixing the objective lens in the aperture portion of the cylindrical wall of the cylindrical lens holder proximate to one end of the aperture portion; and fitting a reinforcement part at least partially in the aperture portion of the cylindrical wall of the cylindrical lens holder proximate to another end of the aperture portion opposite to the objective lens, so that the reinforcement part is fixed to the cylindrical lens holder;

wherein the reinforcement part which is at least partially fitted in the another end of the aperture portion has a thickness in a direction transverse to an axis of the cylindrical lens holder which is greater than a thickness in the direction transverse to the axis of the cylindrical lens holder of at least a portion of the cylindrical wall of the cylindrical lens holder which extends from the another end of the aperture portion of the cylindrical lens holder toward the one end of the aperture portion where the objective lens is fixed so as to enhance the stiffness of the cylindrical lens holder at least proximate to the another end of the aperture portion.

10. The manufacturing method of an objective lens module according to claim 9, wherein the method further comprises molding the reinforcement part so that the reinforcement part has a size one third to one half of the cylindrical wall of the cylindrical lens holder from the another end of the aperture portion along the optical axis.

11. The manufacturing method of an objective lens module according to claim 9, wherein the fitting of the reinforcement part in the aperture portion opposite to the objective lens of the lens holder includes inserting at least a portion of the reinforcement part within the aperture portion of the cylindrical lens holder from the another end opposite to the one end of the aperture portion of the cylindrical lens holder where the objective lens is fixed.

12. The manufacturing method of an objective lens module according to claim 11, wherein the reinforcement part is molded so that the reinforcement part has a size which extends to at least one third of a height of the cylindrical wall of the lens holder and the reinforcement part has a portion which extends radially outwardly beyond the cylindrical wall of the cylindrical lens holder.

13. The manufacturing method of an objective lens module according to claim 12, wherein the reinforcement part is molded to have a size no greater than ½ of the height of the cylindrical wall of the cylindrical lens holder.

14. The manufacturing method of an objective lens module according to claim 9, wherein the reinforcement part and the another end of the aperture portion do not support another objective lens thereat.

* * * * *